(12) United States Patent
Lazareth

(10) Patent No.: US 10,342,380 B2
(45) Date of Patent: Jul. 9, 2019

(54) BREWING DEVICE WITH FORCED CIRCULATION

(75) Inventor: Philippe Lazareth, Argonay (FR)

(73) Assignee: PHI & TEA, Faverges (FR)

( * ) Notice: Subject to any disclaimer, the term of this patent is extended or adjusted under 35 U.S.C. 154(b) by 653 days.

(21) Appl. No.: 14/128,230

(22) PCT Filed: Jun. 21, 2012

(86) PCT No.: PCT/IB2012/053158
§ 371 (c)(1),
(2), (4) Date: Dec. 20, 2013

(87) PCT Pub. No.: WO2012/176156
PCT Pub. Date: Dec. 27, 2012

(65) Prior Publication Data
US 2014/0116257 A1 May 1, 2014

(30) Foreign Application Priority Data
Jun. 24, 2011 (FR) ...................................... 11 55598

(51) Int. Cl.
*A47J 31/00* (2006.01)
*A47J 31/46* (2006.01)
*A47J 31/18* (2006.01)

(52) U.S. Cl.
CPC .............. *A47J 31/46* (2013.01); *A47J 31/18* (2013.01)

(58) Field of Classification Search
CPC ............. A47J 31/00; A47J 31/04; A47J 31/54
USPC ................................... 99/283, 279, 280, 293
See application file for complete search history.

(56) References Cited

U.S. PATENT DOCUMENTS

| | | | | |
|---|---|---|---|---|
| 4,683,812 A | * | 8/1987 | Tarlow ................... | A47J 31/404 222/169 |
| 4,888,466 A | * | 12/1989 | Hoffmann ............... | A47J 31/56 219/433 |
| 5,669,287 A | * | 9/1997 | Jefferson, Jr. ............. | A23F 5/26 99/295 |
| 5,738,001 A | * | 4/1998 | Liverani .................. | A47J 31/36 99/280 |
| 6,142,063 A | * | 11/2000 | Beaulieu .................. | A47J 31/32 99/283 |
| 6,612,224 B2 | * | 9/2003 | Mercier .................... | A23F 3/18 426/433 |
| 6,964,222 B1 | * | 11/2005 | Tucker .................. | A47J 31/057 99/281 |

(Continued)

*Primary Examiner* — Dana Ross
*Assistant Examiner* — Ayub A Maye
(74) *Attorney, Agent, or Firm* — William H. Eilberg

(57) ABSTRACT

A timed brewing device includes a container (1) combined with a base (2) with which the former communicates via a first passage (1c) provided in the bottom wall (1e) thereof. The base (2) includes a brewing compartment (3) receiving a removable chamber wall which is pervious to water and which is capable of receiving a material to be brewed. A transversely movable valve (4) enables the brewing chamber to be selectively placed in contact (3) with the inner space of the container (1) via the first passage (1c). The valve (4) is actuated by an actuating device, which moves the valve into the closed position after a predetermined amount of time. During brewing, a pump (21) intermittently circulates the brewed liquid between the bottom of the brewing compartment (3) and a second passage (1d) of the container (1).

15 Claims, 13 Drawing Sheets

(56) References Cited

U.S. PATENT DOCUMENTS

| | | | |
|---|---|---|---|
| 6,968,775 B2* | 11/2005 | Burrows | A47J 31/057 99/302 R |
| 7,640,843 B2* | 1/2010 | Halliday | A47J 31/4407 426/115 |
| 8,047,124 B2* | 11/2011 | Lin | A47J 31/10 99/286 |
| 8,495,949 B2* | 7/2013 | Tinkler | A47J 31/32 99/280 |
| 2004/0244599 A1* | 12/2004 | Wei | A47J 31/0615 99/279 |
| 2008/0017042 A1* | 1/2008 | Almblad | A47J 31/007 99/280 |
| 2009/0178569 A1 | 7/2009 | Tucker | |
| 2011/0226343 A1* | 9/2011 | Novak | A23L 2/54 137/12.5 |

* cited by examiner

US 10,342,380 B2

BREWING DEVICE WITH FORCED CIRCULATION

TECHNICAL FIELD OF THE INVENTION

The present invention relates to devices for preparing brewed beverages, for example of the tea or tisane type.

Traditionally, brewed beverages were prepared by placing the material to be brewed in a container of the teapot type, pouring hot water into the container, and then drawing off the beverage from the container through a strainer.

Alternatively, the material to be brewed may be inserted into a brewing sock or brewing ball which is placed in the container.

More recently, the material to be brewed has been accommodated in water-permeable bags which are immersed in the hot water in a cup or teapot.

A first drawback of the known brewing devices is the difficulty of controlling the amount of brewing time in order to provide satisfactory brewing quality. Specifically, it is accepted for example that a correct brew requires around three minutes for green tea, around five minutes for black tea and around seven minutes for white tea. A different amount of brewing time results either in an inadequate brew if the amount of time is too short, or in a brew of mediocre quality if the amount of time is too long and results in the passage of undesirable material into the beverage, making it bitter.

In order to obtain a correct brew, it is thus necessary to control the amount of brewing time, this requiring sustained attention on the part of the user and the necessary withdrawal of the material to be brewed at the end of the satisfactory amount of brewing time. During these operations, the user is thus disrupted from any other activities which he wishes to carry out, and it is wise for him to wait for the end of the amount of brewing time.

Another drawback of the above devices is the necessity to remove the material to be brewed at the end of the amount of brewing time, this requiring the provision of appropriate receptacles for receiving the brewed material, especially since this material contains water that is likely to drain out and cause stains.

More recently, a tea machine has been proposed in which a source of hot water produces a current of hot water through a receptacle for material to be brewed, the water charged with material to be brewed being poured immediately into a cup. The drawback of such a device is that brewing is not correct since what occurs is more washing of the material to be brewed rather than genuine brewing.

Document US 2009/0178569 A1 also discloses a brewing device comprising a container having a wall provided with an upper access wall, said container being able to receive and contain a volume of water, and comprising a brewing compartment able to receive and contain a material to be brewed and to place it in communication with the container. The wall of the container is provided with a brewing passage, located at a distance from the upper access opening so as to be immersed in the volume of water. The brewing compartment is designed to be attached and fixed to the container in a manner facing the brewing passage which places it in communication with the container. The device comprises a first valve, which is able to shut off the communication between the brewing compartment and the container for as long as the water contained in the container has not reached a predetermined temperature to start brewing. At the end of infusion, a second valve provided in the container opens in order to pour the brewed liquid contained in the container into an external vessel. Such a device is relatively complex and requires an external vessel to receive the brewed liquid.

SUMMARY OF THE INVENTION

The problem addressed by the present invention is to design a brewing device that allows the brewing quality and amount of brewing time to be controlled correctly without any intervention on the part of the user.

At the same time, the invention aims to avoid the use of external containers and to avoid the risks of stains that result from the handling of material to be brewed at the end of the amount of brewing time.

At the same time, the invention aims to design a device of the kind which allows the user to refrain from any operation after initiating the brewing step, so that he can carry out other activities without waiting for the end of the amount of brewing time.

According to another object, the invention aims to design a device of the portable kind, which can be transported as soon as the brewing step has been initiated, in order to facilitate the other activities on the part of the user.

According to another object, the invention aims to design a device of the kind which is autonomous, easy to use, in complete safety.

According to another object, the invention provides a device of the kind which ensures efficient and rapid brewing and which is inexpensive.

In order to achieve these and other aims, the invention proposes a brewing device comprising:

a container having a wall provided with an upper access opening for receiving and containing a volume of water, a brewing compartment which is able to receive and contain material to be brewed and communicates with the container via a first passage located at a distance from the upper access opening so as to be immersed in the volume of water, a second passage, separate from the first passage, which places the brewing compartment into communication with the container via a loop circuit through which the water can flow between the container and the brewing compartment, propulsion means for forcing the flow of water in said loop circuit, means for interrupting the flow of water between the brewing compartment and the container at the end of a predetermined amount of brewing time.

The loop circuit efficiently transfers the brewed material from the brewing compartment to the container.

On account of the interruption of the flow of water at the end of the correct amount of brewing time, the user no longer has to keep an eye on the amount of brewing time or to remove the material to be brewed at the end of this amount of time. The amount of time is thus perfectly controlled. At the same time, the risk of stains is eliminated, since it is no longer necessary to withdraw the material to be brewed in order to interrupt infusion. No external vessel is necessary at the end of the amount of brewing time. Moreover, the user may optionally transport the device with him in order to carry out other activities, without having to wait for the end of the amount of brewing time, and without risking lacking a receptacle intended to receive the material to be brewed at the end of the amount of brewing time.

In addition, the brewing device may be of such a kind that:

the first passage comprises a first orifice provided in the bottom of the container and an upper orifice provided in the upper wall of the brewing compartment, said orifices being positioned in a manner facing one another, the means for interrupting the flow of water comprise a valve which selectively shuts off the first passage, the second passage places the container into communication, via the loop circuit, with a lower orifice provided in the lower part of the brewing compartment.

In this way, the valve efficiently isolates the container from the material to be brewed in order to interrupt the transmission of brewed material toward the container, even if the brewing device is being moved.

In practice, provision may be made of:

driving means for moving the valve between a withdrawn position and a position shutting off the first passage, time control means for controlling the driving means and causing the first passage to be shut off at the end of the predetermined amount of brewing time.

Alternatively or in addition, provision may be made for:

the propulsion means to comprise a pump inserted into the loop circuit, the means for interrupting the flow of water to comprise time control means which interrupt the operation of the pump at the end of the predetermined amount of brewing time.

Such a structure is robust and inexpensive, and stopping the pump can efficiently interrupt the transmission of brewed material toward the container as long as a pouring or agitating movement is not applied to the brewing device.

Preferably, when a pump is provided:

the first passage has a cross section larger than or equal to the cross section of the brewing compartment, the second passage is close to the first passage.

The difficulties of priming the pump are thus avoided.

Preferably, when a pump is provided, the time control means can ensure intermittent operation of the pump during the predetermined amount of brewing time.

An excellent brewing quality is thus ensured.

BRIEF DESCRIPTION OF THE DRAWINGS

Further subjects, features and advantages of the present invention will become apparent from the following description of particular embodiments, given in relation to the attached figures, in which.

DESCRIPTION OF THE PREFERRED EMBODIMENTS

Figure 1:
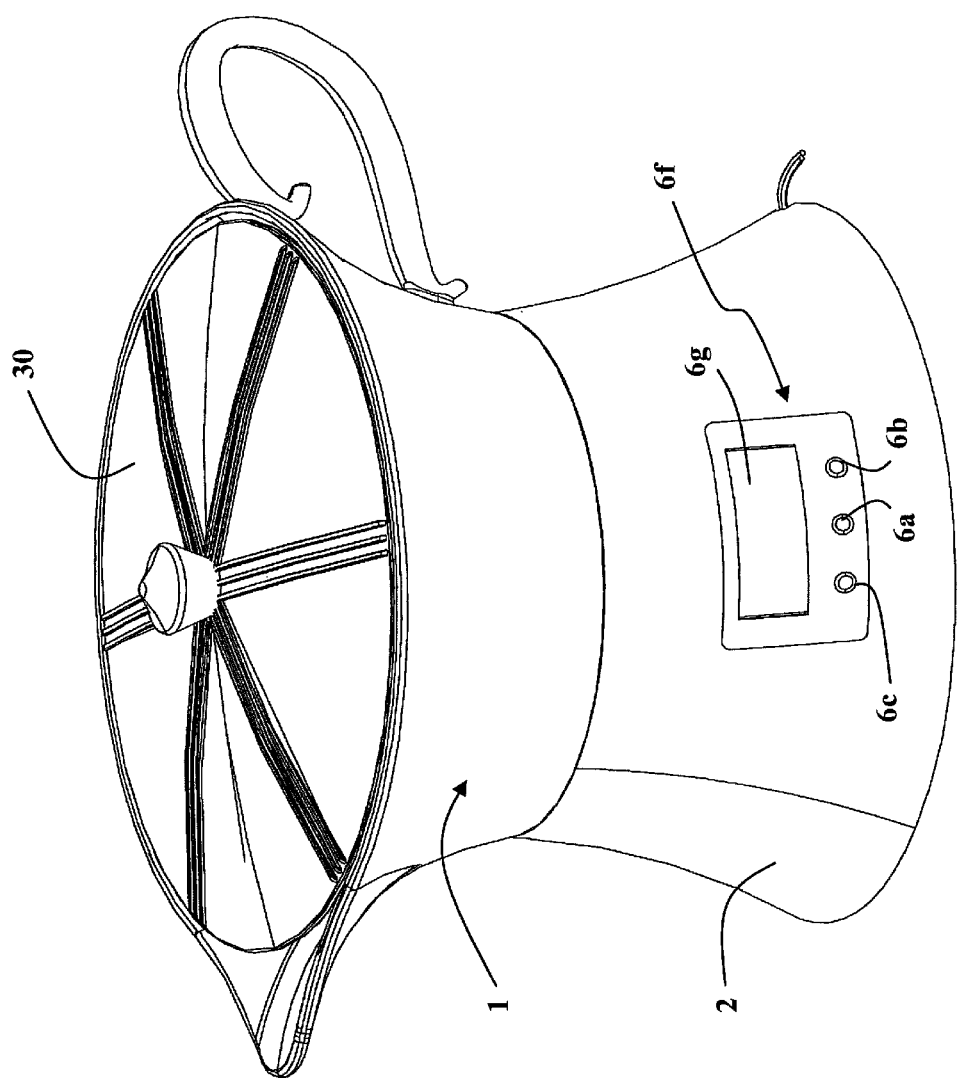
FIG. 1 illustrates in perspective a general view of a timed brewing device according to one embodiment of the present invention.

As illustrated in the figures, a brewing device according to the present invention generally comprises a container 1 and a base 2 provided with means for timed brewing.

The container 1 is limited by a wall 1a (FIG. 3) in which an upper access opening 1b and a first passage 1c are provided.

The first passage 1c is at a distance from the upper access opening 1b, being located in the container 1 at a level that allows it to be immersed in a volume of water introduced into the container 1 during use.

The first passage 1c communicates with a brewing compartment 3 designed to receive and contain a material to be brewed such as tea or tisane.

The base 2 contains the brewing compartment 3, which is itself able to receive a brewing cartridge 5 (FIGS. 4, 8 to 10) in the form of a removable chamber having a water-permeable wall and is able to be inserted into the brewing compartment 3 from the inside of the container 1.

In the embodiment illustrated, provision is made of a timed valve 4 which is structured and arranged so as to shut off the first passage 1c and thus to interrupt the communication between the brewing compartment 3 and the container 1 at the end of a predetermined amount of brewing time.

The brewing compartment 3 is a housing which is smaller than the container 1 and communicates with the container 1 through the first passage 1c. In practice, the cross section of the first passage 1c is approximately equal to the cross section of the brewing compartment 3, which itself has a leaktight and cylindrical side wall 3a, an upper wall 2a which itself forms a part of the upper wall of the base 2, an upper orifice 3b (FIG. 8) provided in the upper wall 2a, and a bottom 3d which is closed and provided with a central lower orifice 3c. The first passage 1c comprises the upper orifice 3b of the brewing compartment 3 and a first orifice if provided on the bottom 1e of the container 1, the two orifices 3b and if being positioned in a manner facing one another.

The brewing compartment 3 is preferably cylindrical, that is to say having a constant section over its height, this section being approximately equal to that of the first passage 1c. Thus, the brewing compartment 3 is suitable for receiving and containing a removable brewing cartridge 5, having water-permeable walls, which is able to be inserted into the brewing compartment 3 by being passed through the container 1 and the first passage 1c.

Figure 2:
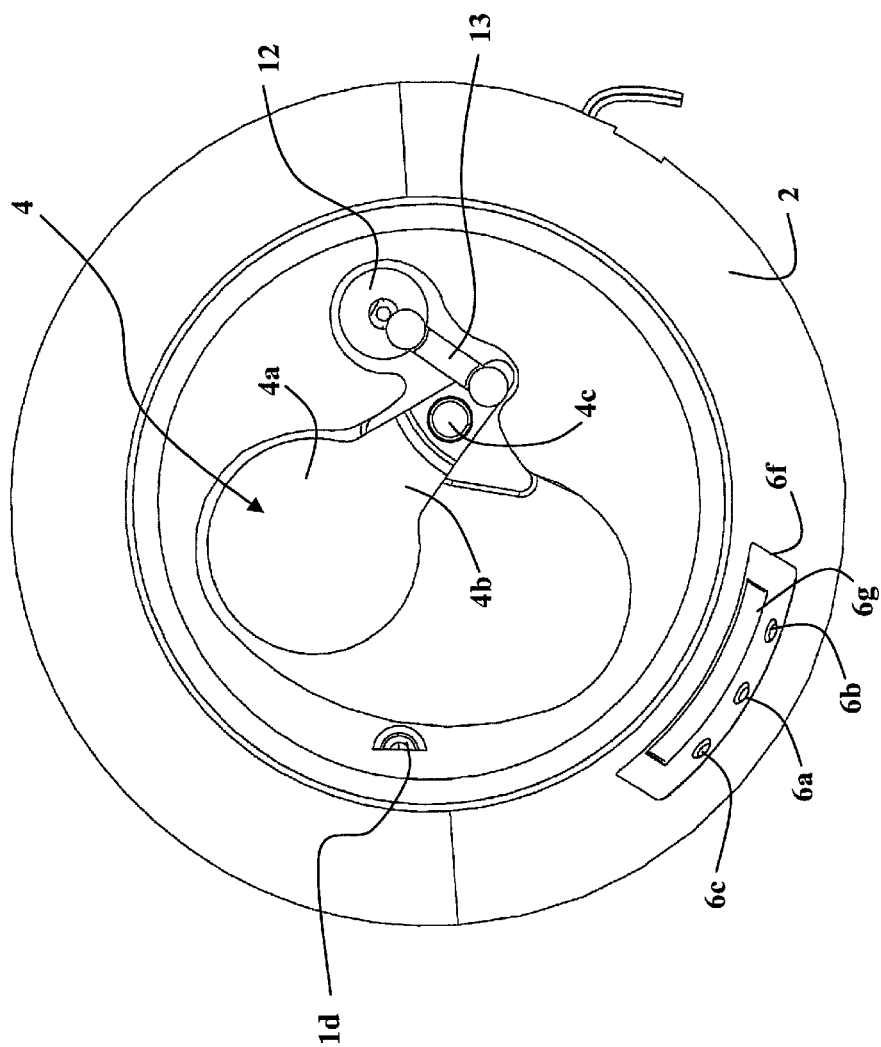
FIG. 2 is a top view of the device from FIG. 1, with the container removed.
Figure 3:
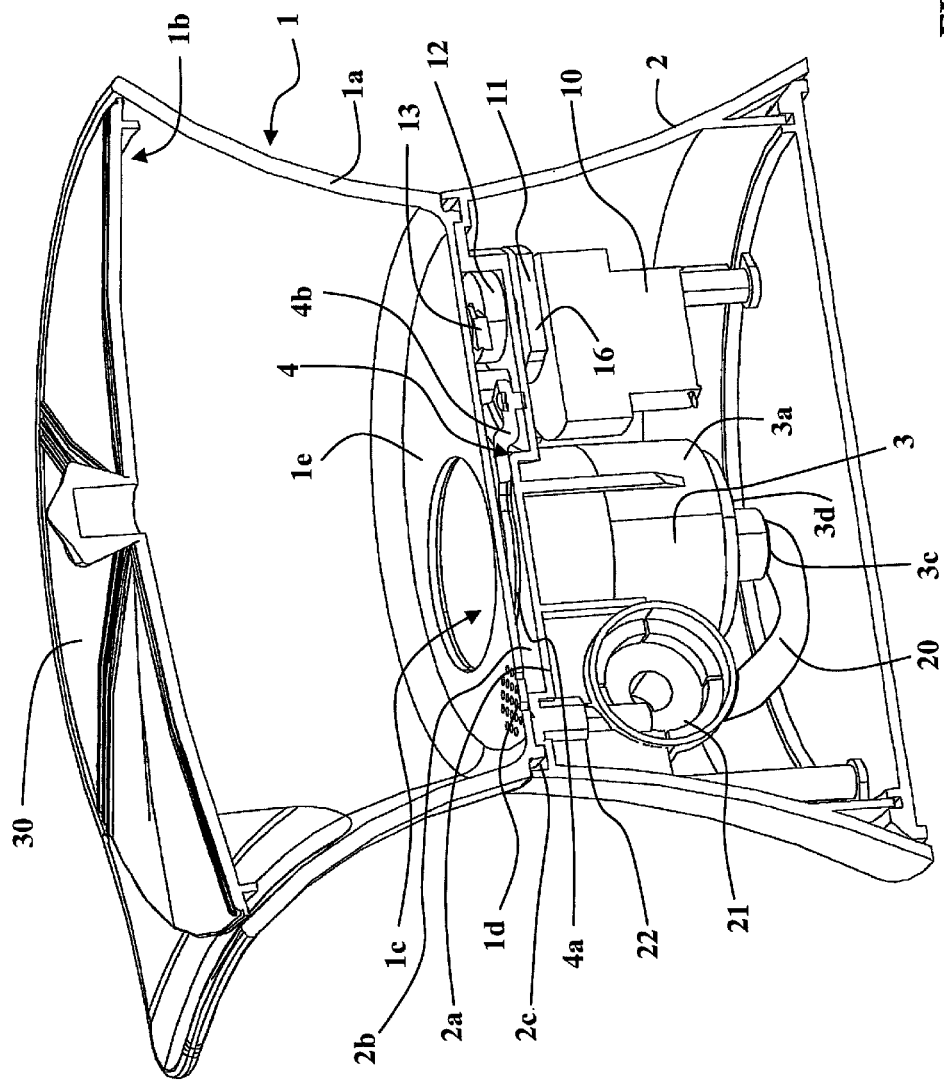
FIG. 3 is a side view in section showing the essential elements of the device from FIG. 1.
Figure 4:
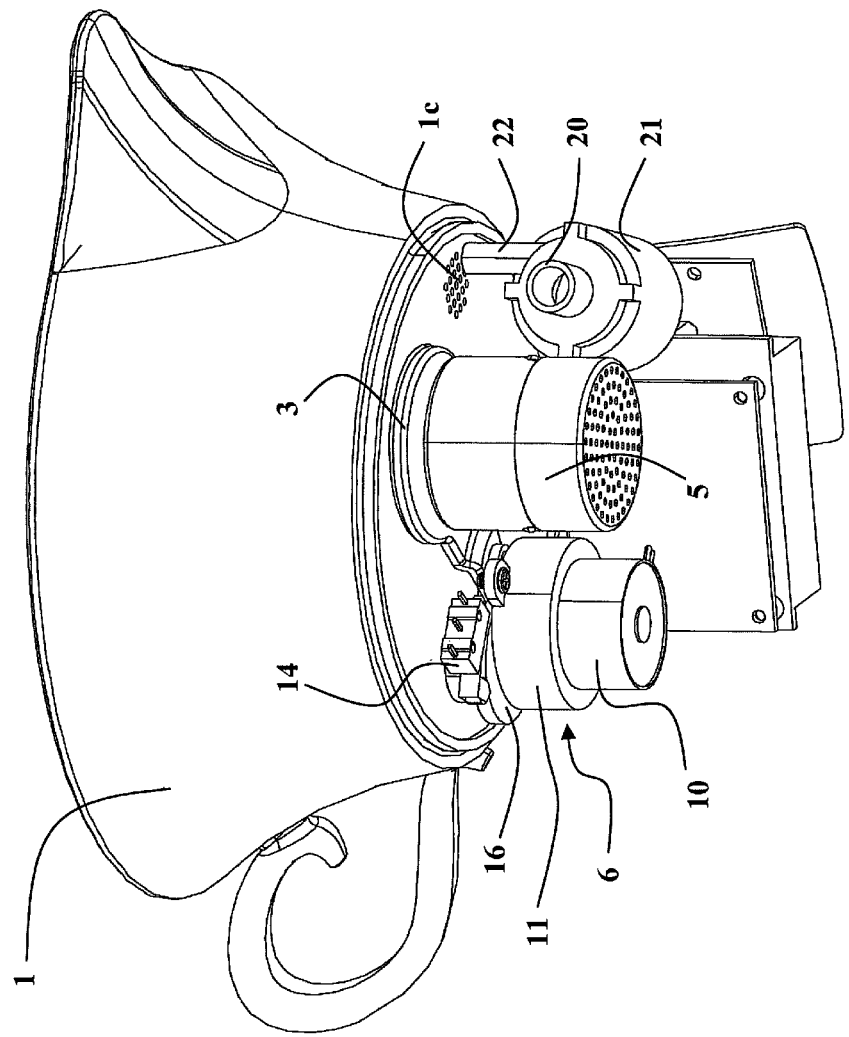
FIG. 4 is a perspective view of the device from FIG. 1, the wall of the base being removed.

In FIGS. 1 to 3, the general structure of the device can be seen.

The upper opening 1b in the container 1 is closed by a removable lid 30. The container 1 has an upwardly flared shape, although any other shapes or sizes may be defined without departing from the scope of the invention. The bottom 1e of the container 1 has the first passage 1c and a second passage 1d. At the periphery of the bottom 1e, the container is connected to the base 2, which is itself downwardly flared and contains the operational members of the device. The container 1 may advantageously be assembled on the base 2 by peripheral snap-fastening 2c with peripheral sealing means. The snap-fastening may be reversible so as to favor the cleaning of the container 1 and of the upper face of the base 2.

Alternatively, the container 1 may be secured to the base 2, forming a non-dismantlable assembly.

The base 2 has an upper wall 2a in which there is provided a housing 2b where the valve 4 moves. The sealing of the housing 2b is ensured by the peripheral sealing means between the container 1 and the base 2.

The timed valve 4 is mounted in the valve housing 2b in a laterally movable manner between a withdrawn position (FIG. 7) which opens up the communication between the brewing compartment 3 and the container 1 for the passage of liquids, and a shutting-off position (FIGS. 2 and 6) in which the valve 4 interrupts the passage of liquids between the brewing compartment 3 and the container 1.

In the embodiment illustrated in the figures, the valve 4 is mounted so as to be movable by rotation. The rotational movement can be seen better in the top views illustrated in FIGS. 6 and 7: in FIG. 7, the timed valve 4 is in the withdrawn position in the valve housing 2b, revealing the brewing compartment 3; in FIG. 6, the valve 4 is in the shutting-off position, concealing the brewing compartment 3.

Figure 6:
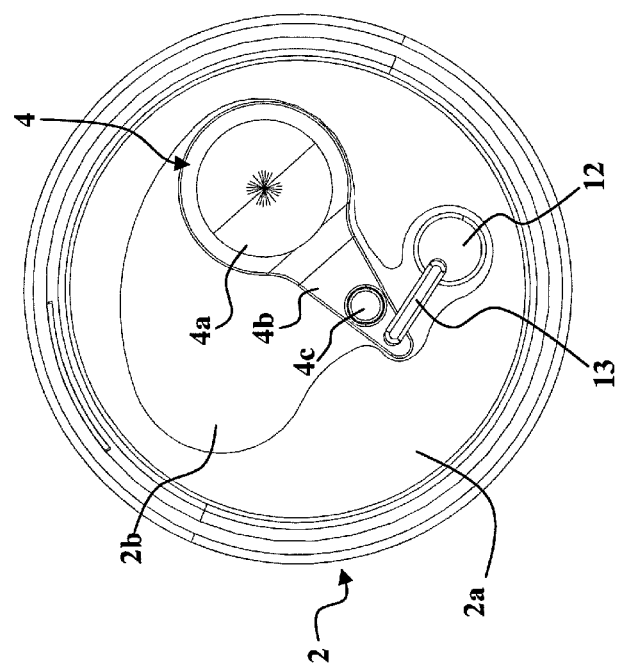
FIGS. 6 and 7 illustrate a top view of the movement of the valve in the base of the embodiment in the preceding figures.

In practice, the valve 4 has a shut-off disk 4a secured to an arm 4b articulated about a pin 4c on the base 2. Thus, the valve 4 pivots about the pin 4c between its withdrawn position (FIG. 7) and its shutting-off position (FIG. 6). It is guided in particular by its lower main face sliding on the bottom of the valve housing 2b.

Driving means 6 move the valve 4 between its withdrawn position and its shutting-off position.

In the embodiment illustrated in the figures, the driving means 6 comprise a valve electric motor 10 (FIG. 3) mechanically connected to the valve 4 by a geared-down transmission 11, the rotary output disk 12 of which is connected to the arm 4b by a link rod 13, more clearly visible in FIG. 2.

Figure 7:
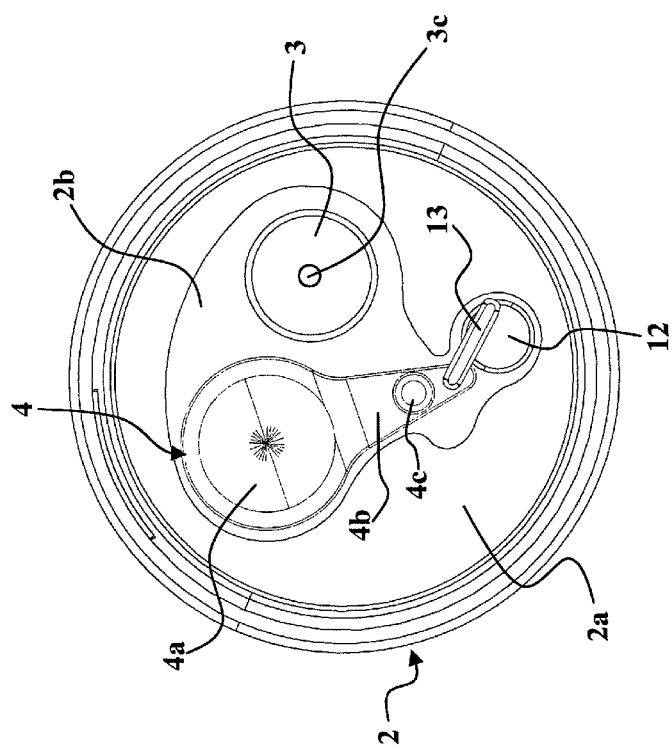
Figure 8:
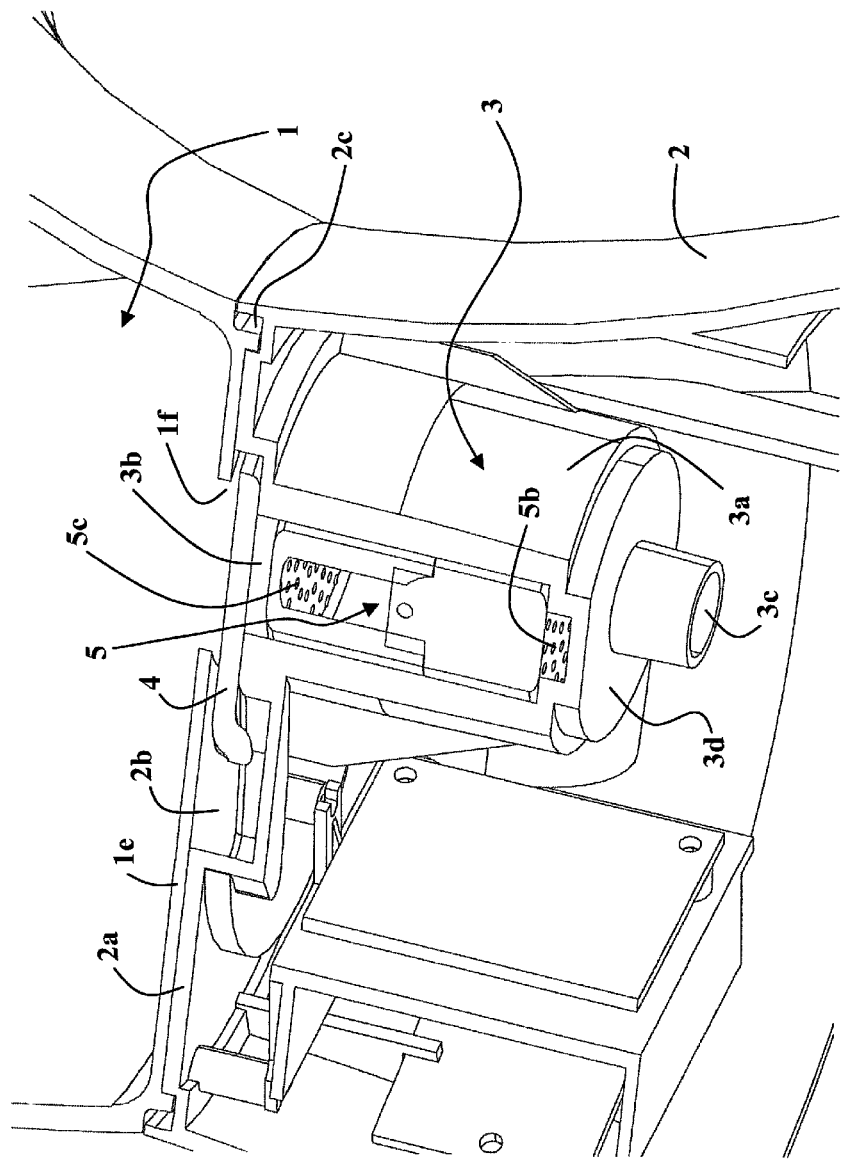
FIG. 8 is a perspective view in partial section illustrating a removable brewing capsule according to a first embodiment, said brewing capsule being fitted in the brewing compartment.

In this way, the rotation of the valve motor 10 in one and the same direction produces an alternating rotation of the valve 4 between its withdrawn and shutting-off positions, as can be understood from FIGS. 6 and 7.

Two angular position sensors 14 and 15 (FIG. 5), which interact with a cam 16 having protuberances 16a, produce a signal which is transmitted to a time control 6e when the valve 4 arrives in the withdrawn position or in the shutting-off position.

Figure 5:
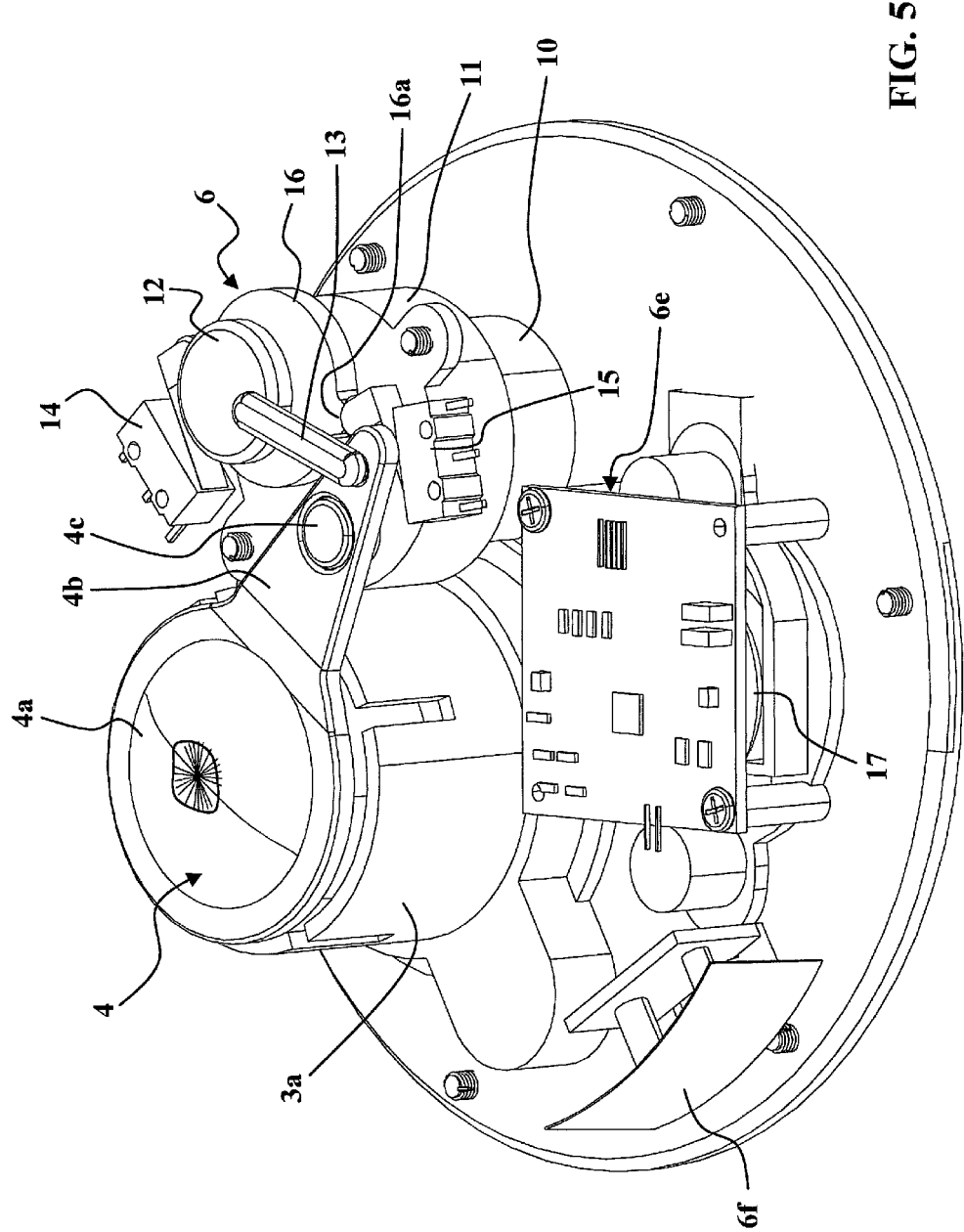
FIG. 5 is a perspective bottom view, with the base cap removed, showing the main actuating members of the valve in one particular embodiment.

The time control 6e ensures that the valve motor 10 is supplied with power from a power source such as a battery or rechargeable battery 17. Alternatively, the power source may be the mains power supply. The time control 6e may ensure that the valve 4 is opened or closed on receiving an operating command produced by an action of the user on a push button 6b of an input member 6f (FIGS. 1, 2 and 5). The time control 6e causes the valve motor 10 to stop in order to hold the valve 4 in the open or closed position on receiving a signal originating from one of the angular position sensors 14 or 15. Subsequently, the time control 6e causes the valve motor 10 to be supplied with power from the power source in order to close the valve 4 at the end of the predetermined amount of brewing time.

The lower orifice 3c in the brewing compartment 3 communicates via an intermediate pipe 20 with a pump 21 which itself communicates via an end pipe 22 with a second passage 1d provided in the bottom wall 1e of the container 1, close to the first passage 1c.

Thus, the brewing compartment 3, the intermediate pipe 20, the pump 21 and the end pipe 22 form a loop circuit through which the water may flow between the container 1 and the brewing compartment 3. The pump 21 forces the flow of water in this loop circuit and forms propulsion means for the water.

In order to interrupt the flow of water between the brewing compartment 3 and the container 1, it is possible both to interrupt the power supply to the pump 21 and to shut off the first passage 1c by way of the valve 4.

However, it may suffice to interrupt the power supply to the pump 21 in order to interrupt the flow of water and the propagation of the brew from the brewing compartment 3 toward the container 1, such that it is possible to provide a simplified embodiment of the invention by omitting the presence of the valve 4 and the driving means thereof. Thus, in this simplified embodiment, which is not illustrated in the figures, the means for interrupting the flow of water between the brewing compartment 3 and the container 1 may comprise just the pump 21, in the absence of the valve 4 and the driving means thereof.

However, since the first message 1c is largely open, in the absence of the valve 4, the propagation of the brew may continue in a certain way, in particular if the brewing device is moved, and it may be preferable to provide a valve 4.

In other words, in the embodiment illustrated, the means for interrupting the flow of water between the brewing compartment 3 and the container 1 at the end of a predetermined amount of brewing time comprise both the valve 4 and the pump 21, with both being controlled by the time control 6e.

The brewing cartridge 5 preferably has a cross section slightly smaller than that of the brewing compartment 3.

Figure 9:
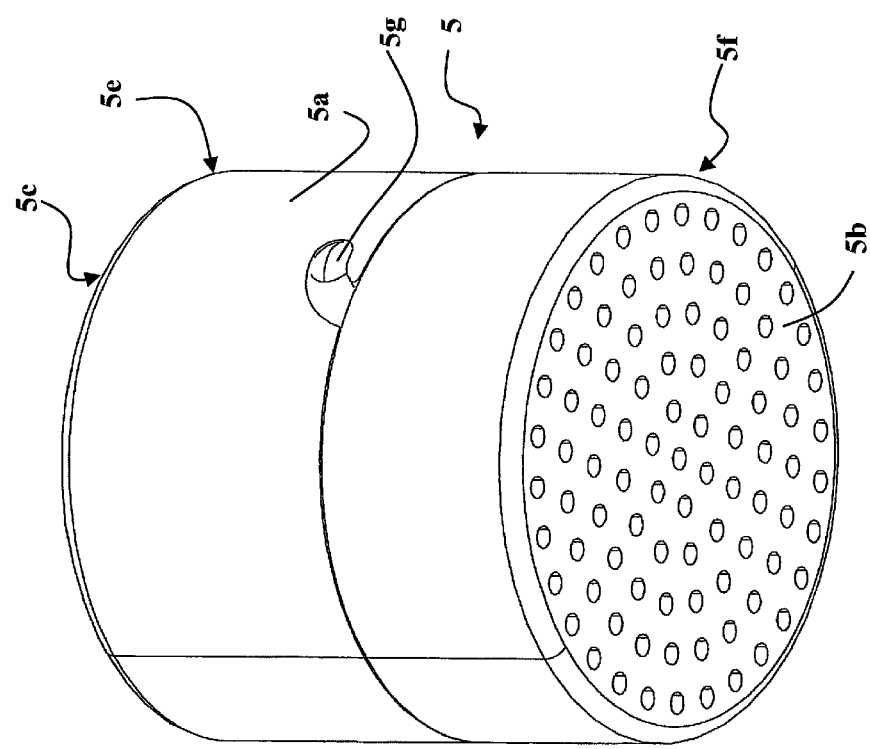
FIG. 9 is a perspective bottom view of a removable brewing capsule according to one embodiment.

One embodiment of such a brewing cartridge 5 is illustrated in FIG. 9 and comprises a cylindrical structure of revolution, having a solid side wall 5a, a bottom wall 5b and a top wall 5c. The bottom wall 5b and the top wall 5c are water-permeable, for example provided with a number of through-holes. The side wall 5a is leaktight and is formed for example by two portions which are separable for filling tea or tisane and which can be connected by a bayonet system 5g.

The brewing cartridge 5 thus comprises two cylindrical cartridge parts 5e and 5f which interlock axially with one another and are held by the bayonet system 5g.

When positioned in the brewing compartment 3, the brewing cartridge 5 is contained entirely in the brewing compartment 3, set back below the first passage 1c and also set back from the bottom 3d of the brewing compartment 3, being kept at a distance from the latter by end stops provided in the brewing compartment 3.

Figure 10:
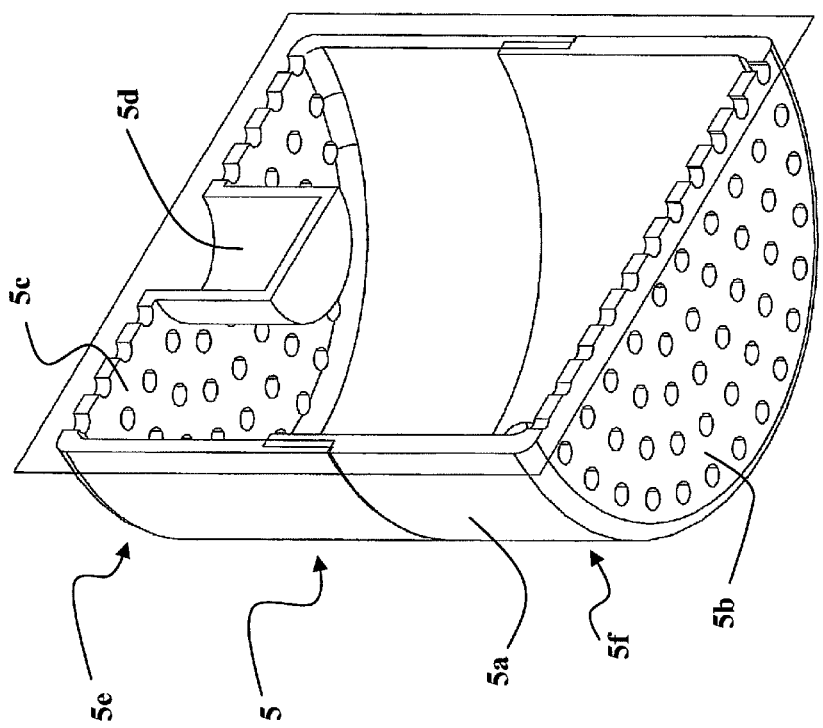
FIG. 10 is a perspective bottom view in diametral section of the brewing capsule from FIG. 9.

Preferably, as illustrated in section in FIG. 10, the top wall 5c comprises a blind gripping recess 5d, in which it is possible to fit a radially expandable rod that forms a gripping tool for taking hold so as to handle the brewing cartridge 5 in order to withdraw it or insert it into the brewing compartment 3.

However, other forms of brewing compartment 3 and brewing cartridge 5 may be provided without departing from the scope of the invention.

The size of the brewing cartridge 5 will be chosen by a person skilled in the art depending on the size of the container 1, such that the brewing cartridge 5 can contain a quantity of tea or of tisane sufficient for producing a correct brew from the volume of water contained in the container 1.

In the device according to the invention, it is possible to use a rigid cartridge 5 to be filled as described above. Alternatively, a prefilled rigid cartridge, for example, may also be used, or else a prefilled flexible cartridge, the wall of which may be made of paper, woven material or nonwoven material.

As can be seen in FIGS. 1 and 2, the input member 6*f* comprises a display 6*g*, a push button 6*a* for controlling the start of counting of the predetermined amount of brewing time, a push button 6*b* which alternately controls the intentional opening and closing of the valve 4, and a push button 6*c* which controls the choice of the amount of time of the brewing cycle.

The display 6*g* may confirm the chosen amount of time of the brewing cycle, and optionally the passage of time. For example, the passage of time may be displayed in a digital form, whereas the chosen amount of time may be displayed by different pictograms.

It will be understood that the time control 6*e* may be realized for example by an integrated microcontroller which is programmed to form a timer that is started by the actuation of the input push button 6*a* and controls electronic switches such as transistors connected in series between an on-board source of DC electric power and operational members of the device, such as the valve motor 10 and the pump 21.

During its rotation, the pump 21 causes the water to flow through the closed circuit formed by the brewing compartment 3, the intermediate pipe 20, the pump 21, the end pipe 22 and the container 1.

Preferably, during its rotation, the pump 21 causes the water to flow in the direction running from the brewing compartment 3 toward the second passage 1*d*, by being drawn in at the bottom 3*d* of the brewing compartment 3 and delivered into the container 1 via the second passage 1*d*. In this way, the brewing products, which tend to propagate naturally toward the bottom 3*d* of the brewing compartment 3, are propelled into the container 1 through the second passage 1*d*.

The time control means 6*e* control both the pump 21 and the valve 4.

Essentially, the time control means 6*e* interrupt the flow of water between the brewing compartment 3 and the container 1 at the end of a predetermined amount of brewing time selected by the user from predefined amounts of time.

The operation of a brewing device as described above is simple, reliable and convenient.

Initially, the brewing device is empty, the container 1 being secured to the base 2. If the valve 4 is closed, the user actuates the push button 6*b* in order to open the valve 4. He removes the brewing cartridge 5 by extracting it from the first passage 1*c*, he fills it with tea or with tisane and replaces it in the brewing compartment 3.

By pressing a push button 6*c* once, twice or three times, the user can select and store the predetermined amount of brewing time, selected from the predefined amounts of time, in the time control 6*e*. Advantageously, the predefined amounts of time may be 2'35", 3'30", 4'35". These amounts of time are suitable for most brews of tea or tisane. Alternatively, the time control 6*e* may be programmed to allow the user to enter any other selected amount of brewing time, for example by incrementing the amount of time in steps of a second.

The user actuates the push button 6*c* prior to maneuvering the push button 6*a* in order to start and initialize the counting of the predefined amount of brewing time.

In order to start the brewing operation, the user pours hot water into the container 1 and pushes the push button 6*a* of the input member 6*f* in order to initialize the time out depending on the predetermined amount of brewing time stored. He can then freely move the device, for example in order to carry out other activities, without waiting for the end of the brewing operation.

During the brewing operation, the time control 6*e* causes the pump 21 to rotate intermittently, for example in a succession of steps: 1'25 stopped, 15" running, 40" stopped, 15" running etc., depending on the amount of time of the brewing cycle. At the end of the predetermined amount of brewing time, stored in the time control 6*e*, the time control 6*e* causes the pump 21 to stop rotating and the valve 4 to close, thereby shutting off the first passage 1*c*. In this way, the material to be brewed is located in an isolated manner in the container 1, and the liquid contained in the container 1 is no longer subjected to brewing.

The brewed liquid present in the container 1 is ready to be consumed, and may wait to be consumed without being impaired by continued brewing.

In the embodiment described above in relation to FIGS. 1 to 10, the brewing device according to the invention does not comprise heating means, and the user must pour sufficiently hot water into the container 1 to allow brewing, as in a customary teapot.

However, the invention is not limited to such a device having no heating means. Thus, FIGS. 11 to 13 illustrate three alternative embodiments in which the device also comprises heating means for bringing to an appropriate temperature the water that the user has been able to introduce in the cold state into the container 1 and into the brewing compartment 3.

Figure 11:
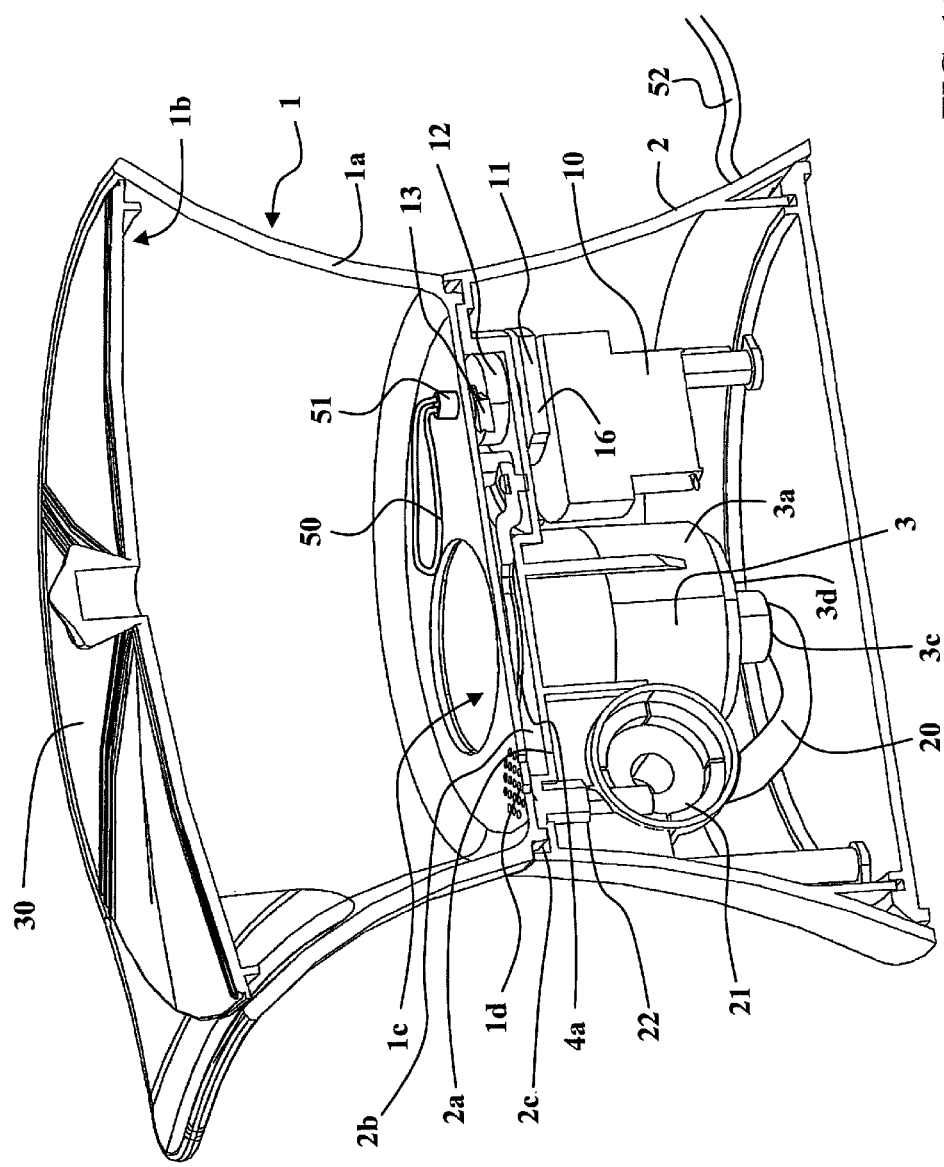
FIGS. 11 to 13 schematically illustrate, in sectional side views, three other embodiments of a timed brewing device according to the invention.
Figure 12:
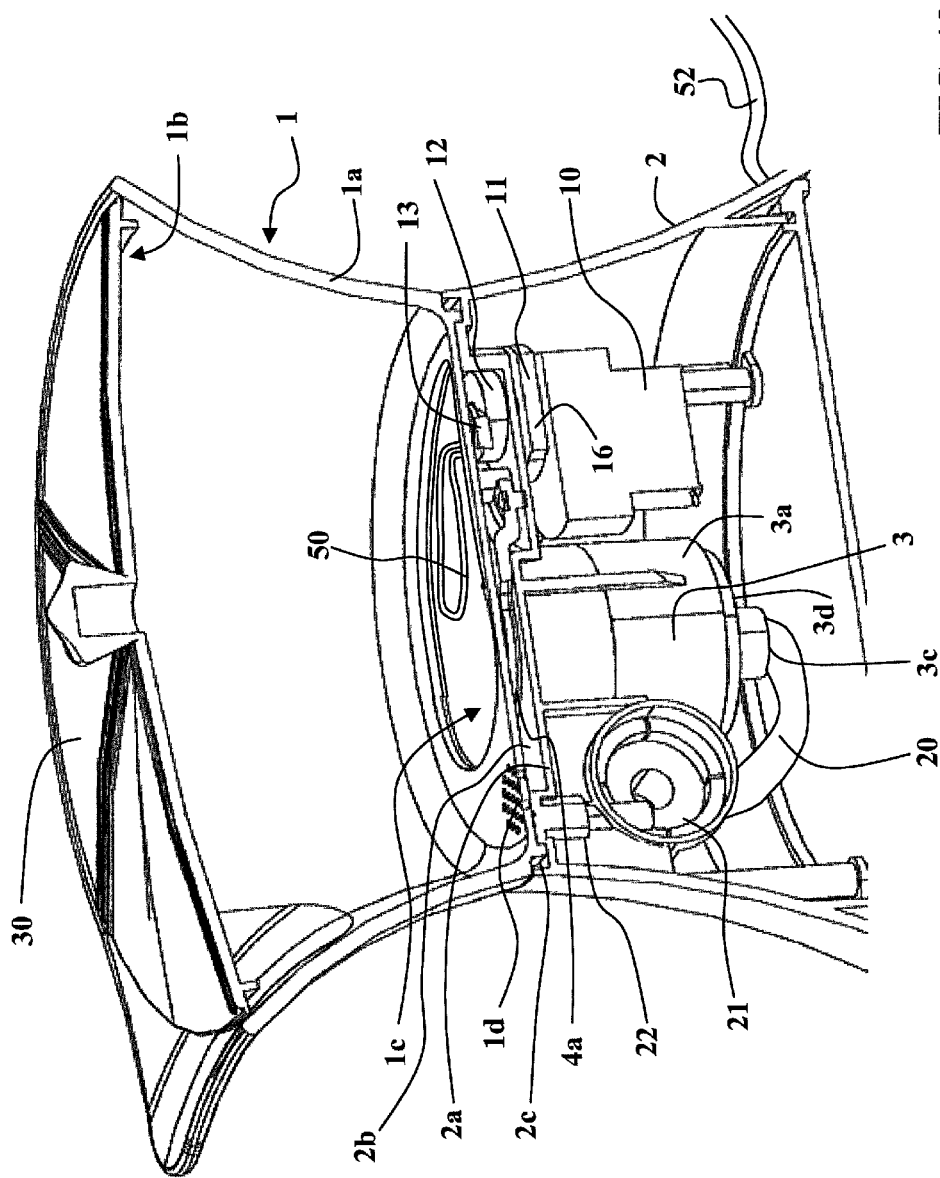
Figure 13:
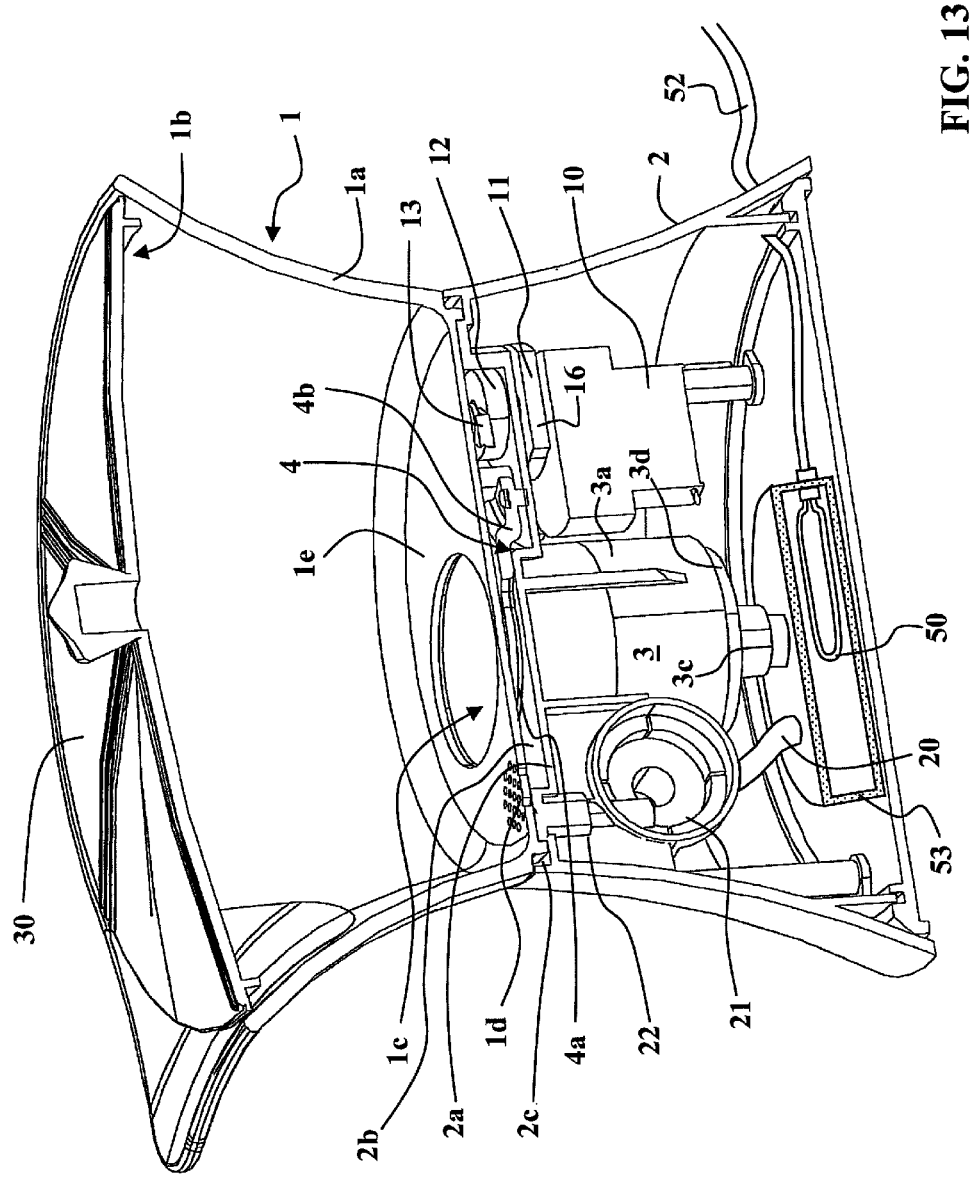

In the three embodiments illustrated in FIGS. 11 to 13, the heating means have an electrical resistor 50, the power of which is selected so as to be able to heat the volume of water contained in the device in order to bring it to a brewing temperature, for example a temperature in the vicinity of 100° C. The electrical resistor 50 may be of the type of those conventionally used in electric kettles. It may be one or more electrical resistors. The electrical resistor 50 is connected to electrical connection means 51 that are able to connect the electrical resistor to an external source of electric power, for example to the conventional electric power distribution network. In practice, the electrical connection means 51 may comprise an electric power supply cord 52 and connecting means such as those conventionally used for electric kettles.

The device may also have a switch in series with the electric power supply cord 52, so as to control the putting into operation or stopping of the electrical resistor 50.

In the embodiment illustrated in FIG. 11, the electrical resistor 50 is located directly inside the container 1. The electrical resistor 50 is then secured to the bottom wall 1*e* of the container 1. In the preferred embodiment in which the container 1 is removable from the base 2, separable electrical connection means are preferably provided, such as a male electrical plug and a corresponding female electrical socket, one being secured to the bottom wall 1*e* of the container 1 and the other being secured to the upper wall 2*a* of the base 2, making it possible to disconnect the resistor 50 when the container 1 is separated from the base 2. The electrical socket secured to the base 2 is connected to the power supply cord 52 in order to ensure the continuity of conduction of electrical power.

In the embodiment in FIG. 12, the container 1 has no bottom wall but is downwardly open. The bottom of the container 1 is in reality formed by the upper wall 2*a* of the base 2. In this case, the electrical resistor 50, which is also in direct contact with the water contained in the container 1, is secured to the upper wall 2*a* of the base 2, is electrically connected to the power supply cord 52 and passes into the container 1 through its lower opening.

In this case, there is no need to disconnect the electrical resistor 50 when the container 1 is separated from the base 2. This is the preferred embodiment from the embodiments for heating the water.

In the embodiment in FIG. 13, the electrical resistor 50 is located in a lower enclosure 53 which is itself in communication with the container 1 via the loop circuit 20, 21, 22 and the propulsion means 21 such as the pump. The electrical resistor 50 is also electrically connected to the power supply cord 52. In this case, the water heated by the electrical resistor 50 is brought into the container 1 and into the brewing compartment 3 by the pump 21.

The present invention is not limited to the embodiments which have been explicitly described, but includes the various alternative forms and generalizations thereof that fall within the scope of the following claims.

The invention claimed is:

1. A brewing device comprising:
    a container having a wall provided with an upper access opening for receiving and containing a volume of water,
    a brewing compartment which is able to receive and contain material to be brewed, the brewing compartment communicating with the container via a first passage located at a distance from the upper access opening so as to be immersed in the volume of water,
    a second passage, separate from the first passage, wherein the brewing compartment communicates with the container via the second passage, wherein the first passage, the second passage, the container, and the brewing compartment together define a closed loop circuit for flow of water, wherein the closed loop circuit provides a path for fluid flow such that fluid flows from the container to the brewing compartment via the first passage, and from the brewing compartment to the container via the second passage, propulsion means for forcing the flow of water in said closed loop circuit, means in said closed loop circuit for automatically interrupting the flow of water between the brewing compartment and the container at an end of a predetermined amount of brewing time, wherein the interrupting means has two positions, including a first position wherein water can flow in either direction, and a second position in which all flow of water is blocked.

2. The brewing device as claimed in claim 1, wherein:
    the first passage comprises a first orifice provided in a bottom of the container and an upper orifice provided in an upper wall of the brewing compartment, said first and upper orifices being positioned in a manner facing one another,
    the means for interrupting the flow of water comprise a valve which selectively shuts off the first passage,
    the second passage places the container into communication, via the closed loop circuit, with a lower orifice provided in a lower part of the brewing compartment.

3. The brewing device as claimed in claim 1, wherein:
    the propulsion means comprise a pump inserted into the closed loop circuit,
    the means for interrupting the flow of water comprise time control means which interrupt the operation of the pump at the end of the predetermined amount of brewing time.

4. The brewing device as claimed in claim 1, wherein the brewing compartment is joined to a brewing cartridge having a solid side wall and having a water-permeable bottom wall and a top wall, wherein the brewing device comprises end stops provided in the brewing compartment that keep the brewing cartridge at a distance from the bottom of the brewing compartment, and wherein the brewing device comprises, in a central part of a bottom of the brewing compartment, a lower orifice connected to the second passage by the closed loop circuit.

5. The brewing device as claimed in claim 1, wherein the interrupting means interrupts the flow of water between the brewing compartment and the container at the end of a predetermined amount of brewing time selected by the user from predefined amounts of time.

6. The brewing device as claimed in claim 1, further comprising:
    electrical resistance heating means which are able to heat said volume of water in order to bring said volume of water to a brewing temperature,
    electrical connection means which are able to connect the electrical resistance heating means to an external source of electrical energy.

7. The brewing device as claimed in claim 2, comprising:
    driving means for moving the valve between a withdrawn position and a position shutting off the first passage,
    time control means for controlling the driving means and causing the first passage to be shut off at the end of the predetermined amount of brewing time.

8. The brewing device as claimed in claim 3, wherein:
    the first passage has a cross section larger than or equal to a cross section of the brewing compartment,
    the second passage is close to the first passage.

9. The brewing device as claimed in claim 3, wherein the time control means ensure intermittent operation of the pump during the predetermined amount of brewing time.

10. The brewing device as claimed in claim 3, wherein the pump forces the flow of water in the closed loop circuit in the direction running from the brewing compartment (3) toward the second passage.

11. The brewing device as claimed in claim 4, wherein the brewing cartridge comprises, in the top wall of said brewing cartridge, a blind gripping recess in which a gripping tool can take hold in order to handle the brewing cartridge.

12. The brewing device as claimed in claim 4, wherein the brewing cartridge comprises two cylindrical cartridge parts which interlock axially with one another.

13. The brewing device as claimed in claim 5, wherein the predefined amounts of time are 2' 35", 3' 30", 4' 35".

14. The brewing device as claimed in claim 6, wherein the electrical resistor or resistors are located in the container and are fixed to the bottom wall of the container or to the upper wall of a base on which the container fits.

15. The brewing device as claimed in claim 6, wherein the electrical resistor or resistors are located in a lower enclosure in communication with the container via the closed loop circuit and propulsion means.

\* \* \* \* \*